Patented Dec. 30, 1941

2,268,415

UNITED STATES PATENT OFFICE 2,268,415

COATING COMPOSITION

Arnold J. Morway, Roselle, and Floyd L. Miller, Roselle Park, N. J., assignors to Standard Oil Development Company, a corporation of Delaware No Drawing. Application October 19, 1938, Serial No. 235,777

7 Claims. (Cl. 260—23)

This invention relates to high molecular weight halogenated organic compounds and compositions containing the same, and it relates more particularly to compositions containing in solution halogenated high molecular weight hydrocarbon polymers, said compositions being particularly adapted to use as coating and impregnating agents and the like.

This application is a continuation-in-part of our co-pending applications Serial Nos. 749,072, filed October 19, 1934, and 170,120 filed October 20, 1937.

The halogenated products of the present invention are produced by the halogenation of substantially saturated, high molecular weight polymers which may be considered to have a chemical structure corresponding to that of a very long chain of carbon atoms containing occasional side chains of alkyl groups, such as methyl, ethyl, etc. Such polymers, which may range from as low as 1,000 or 5,000 up to 250,000 or more in molecular weight, although the preferred range is between 5,000 and 200,000 molecular weight, are very stable and relatively inert chemical compounds, being substantially completely saturated with respect to hydrogen and having a very low iodine number, e. g. about 7 or less. Polymers of this type may be prepared by polymerizing iso-olefins preferably having the general formula $R(R')C:CH_2$, where R and R' represent aliphatic hydrocarbon radicals, preferably alkyl radicals having 1 to 4 carbon atoms, such as isobutylene, 2-methyl-1-butene, and the like. The polymerization should be carried out at low temperatures, for example, below —10° C. or —50° C. or even as low as —100° C. or lower, in the presence of a volatile inorganic halide catalyst, such as boron fluoride or complexes thereof, for example $BF_3$—$H_2O$, $BF_3$—$H_2SO_4$, etc. or other halides such as aluminum chloride, tin tetrachloride and the like. The polymerization is preferably carried out in the presence of a suitable solvent for the isobutylene, such as liquefied normally gaseous hydrocarbons, e. g. propane, propylene, ethane, ethylene and the like, which may serve in the double capacity of solvent as well as refrigerant by boiling and thereby removing the exothermic heat of polymerization.

The halogenated derivatives of the above-described polymers are prepared, for example, by contacting a halogen, such as chlorine, bromine or fluorine, with a solution of a high molecular weight hydrocarbon of the structure described, either in the dark or in the presence of sunlight or artificial light, and in the presence or absence of a catalyst such as iodine; or, if the polymer is a liquid of low viscosity, the halogenation may be accomplished by simply passing the halogen through the polymer, without the use of a solvent. The solvent, if used, may be any one which is non-reactive with the halogen being used, or which, if reactive therewith, will not cause any harmful effect on the high molecular weight product. Carbon tetrachloride has been found very suitable. Other solvents, such as carbon disulfide, may be used. The temperature to be used for the halogenation may vary depending upon a number of factors, such as a desire to speed halogenation, the concentration of materials and any catalytic promoting influences, but generally the temperature should be between the approximate limits of —50° C. and 100° C. The halogenation may be carried out at atmospheric pressure or considerably higher pressures, such as 5 to 50 or 100 atmospheres or more, especially when carrying out the reaction at low temperature.

Various methods may be used for treating the high molecular weight hydrocarbon with the halogen. For example, chlorine may be bubbled through a carbon tetrachloride solution of the high molecular weight polymer, or the chlorine may be subjected to a countercurrent spray of a solution of the polymer. Another alternative is to carry out the halogenation treatment in the presence of bases, e. g., calcium or magnesium oxides or carbonates, sodium carbonate or bicarbonate, etc., or over water containing an insoluble carbonate, such as calcium carbonate or magnesium carbonate, for the purpose of absorbing hydrogen halide liberated by the reaction.

If desired, instead of first preparing the polymer in relatively pure form and then dissolving it in a suitable solvent and passing the halogen through the solution, the original polymerization of isobutylene, for example, may be carried out in the presence of carbon tetrachloride or other solvent which will be suitable for the halogenation, and then as soon as the polymerization process is completed the solution of the high molecular weight polymer may be treated immediately with a desired halogen, thereby avoiding the removal of the solvent used during the polymerization step and subsequent redissolving of the polymer in a solvent for the halogenation step.

After the halogenation has been completed to the desired degree, the halogenated product may be separated from the solvent by precipitation, evaporation or other suitable means, such as pouring the solution slowly, or else forcing it through a jet under high pressure, into boiling water, thereby effecting a steam distillation of the solvent. If desired, after the halogenation has been completed, the solution may be blown with air or inert gas, such as nitrogen or hydrogen, at a slightly elevated temperature, but preferably not above 100° C., in order to remove hydrogen halide. Any traces still remaining may be removed by further blowing the liquid with ammonia, or other volatile amine, alone or mixed with air or inert gas, preferably at room temperature or perhaps up to 40 or 50° C.

As an alternative, the product may be washed one or more times with dilute alkali, such as caustic soda, in order to remove any free hydrogen halide remaining as a result of the halogen treatment. It may also, under some circumstances, be desirable to heat the halogenated polymer at a low temperature with a basic material, such as alcoholic potash, aqueous calcium hydroxide, sodium carbonate solution, sodium bicarbonate, etc., to remove one or possibly more halogen atoms and thereby produce a further stabilized product. A difficultly volatile basic compound, preferably an aromatic amine such as monoethyl aniline or methyl naphthylamine, may be added as a stabilizer (in proportions of 0.1 to 1% or so) to the finished halogenated hydrocarbon.

The amount of halogen incorporated in the material depends upon the duration of the treatment. As little as 1% to 10% and as much as 70%, or more, may be incorporated, if desired.

The products prepared according to the present invention are high molecular weight halogenated hydrocarbons and they are either viscous liquids or brittle solids or substances of more or less intermediate characteristics in the nature of plastic solids, depending upon the nature of the original material treated and the duration and type of treatment. For example, solvent-free samples of a chlorinated isobutylene polymer obtained by the chlorination of an approximately 60,000 molecular weight isobutylene polymer and containing less than about 25% of chlorine are plastic at room temperature both with an without plasticizers or residual solvent, and will not break under a sharp blow; while solvent-free samples of the same material containing 35% of chlorine or higher are hard and quite brittle at room temperature; and the same material containing 60% chlorine is a white powder with no elastic properties. The chlorinated isobutylene polymer prepared as described above and having a chlorine content in the range of 25–35% may be either brittle or plastic depending upon the amount of plasticizer or residual solvent present and upon the amount of molecular breakdown which has taken place during the halogenation process. Brittleness increases markedly with decreasing temperature.

The halogenated products, such as chlorinated isobutylene polymer, are characterized by their stability toward sunlight and artificial ultra-violet light, air, hot and cold water, and chemical agents, such as solutions of acids, bases and salts. The products are also quite stable toward heat. Chlorinated isobutylene polymer containing 40% chlorine and stabilized by refluxing with a sodium hydroxide solution was found to be completely stable at a temperature of 100° C.

The products of this invention compare favorably with chlorinated rubber as a base for chemically resistant coating compositions in that (1) rubber containing small amounts of chlorine is unstable while the present products are relatively stable; (2) the present products are miscible with paraffin wax while chlorinated rubber is not; (3) the present products show greater stability toward ultra-violet light than chlorinated rubber; (4) the two types of products are about equal in resistance to dilute hydrochloric acid; (5) the present products are superior to chlorinated rubber in resistance to sodium hydroxide solutions; and (6) the two products are about equal in ability to withstand artificial weathering tests. The above comparisons with chlorinated rubber apply particularly to chlorinated isobutylene polymer containing 40% or more of chlorine. An advantage in the use of the halogenated hydrocarbon polymers in coating compositions, as compared with chlorinated rubber, consists in the fact that solutions of the chlorinated polymers of the same viscosity as solutions of chlorinated rubber of the same chlorine content contain more added resin. For example, a solution of 2 parts of chlorinated isobutylene polymer of 70% chlorine content and 1 part of toluene has approximately the same viscosity as a solution of 1 part of chlorinated rubber of 70% chlorine content in two parts of toluene. Hence, chlorinated isobutylene polymer finishes can be applied with less loss of solvent than those containing chlorinated rubber.

The high molecular weight halogenated products of the present invention are soluble in many volatile solvents which are suitable for the preparation of coating compositions of various kinds. As an example, chlorinated isobutylene polymer has been found to be soluble in the following well-known solvents: ethyl acetate, amyl acetate, n-butyl laurate, isobornyl acetate, methyl cyclohexyl oxalate, butyl propionate, propyl propionate, ethyl propionate, n-butyl crotonate, sec-hexyl acetate, isopropyl acetate, mesityl oxide, di-isopropyl ketone, diphenyl oxide, isopropyl esters of fatty acids produced by the air oxidation of petroleum waxes, methyl propyl ketone, methyl ethyl ketone, methyl n-butyl ketone, methyl cyclohexanone, methyl n-amyl ketone, cyclohexanone, benzene, toluene, xylene, nitrobenzene, ethyl benzene, sec-butyl benzene, crotonaldehyde, pyridine, monochlorbenzene, carbon tetrachloride, chloroform, amyl naphthalene, dimethyl naphthalene, "Dowtherm A," (diphenyl oxide and diphenyl), sec-hexyl chloride, tetrachlorethane, dichloracetic acid, "Diethyl Cellosolve" (diethyl ether of ethylene glycol), dichlorethyl ether, turpentine, tetralin and trimethyl aniline. This substance is also partially soluble in acetone, diethyl ether and "Cellosolve Acetate" (acetic acid ester of monoethyl ether of ethylene glycol). The chlorinated isobutylene polymers having a low chlorine content (about 25% or lower) and those having a high chlorine content (substantially above 50%) are also quite soluble in aliphatic petroleum hydrocarbon liquids, those having intermediate chlorine contents being somewhat less soluble. The polymers of all degrees of chlorination are readily soluble in petroleum fractions containing aromatic material, such as sulphur dioxide extracts of petroleum distillates. Incorporation of the polymers in non-aromatic petroleum fractions may be facilitated by the use of mutual solvents, such as aromatic hydrocarbons, chlorinated aliphatic hydrocarbons, ketones or esters.

The following examples illustrate various methods of preparing solutions of chlorinated hydrocarbon polymers:

Example 1

Chlorine gas is passed under pressure through vents in the bottom of a tower packed with broken porcelain or spiral packing; when the tower has become saturated with the chlorine gas a solution of isobutylene polymer in carbon tetrachloride is sprayed in at the top of the tower passing down through the chlorine gas and being removed at the bottom of the tower and pumped back to the top of the same tower or other similar towers and the contact repeated until the chlorine content has reached the required amount.

The gaseous mixture removed at the top is scrubbed free of HCl by passing through solid caustic soda and again passed in at the bottom of the tower. The carbon tetrachloride solution of chlorinated isobutylene polymer is washed free of HCl by a slight carbonate washing and the carbon tetrachloride removed by distillation.

*Example 2*

In the removal of traces of carbon tetrachloride from the washed solution of chlorinated isobutylene polymer in carbon tetrachloride, almost the total amount of solvent is removed by mere distillation, either atmospheric or under reduced pressure, the remaining traces of solvent being removed by dissolving the practically solvent-free chlorinated product in close cut naphtha with a boiling range close to the boiling point of carbon tetrachloride (76° C.) and redistilling. The solution thus formed may be used in the preparation of coating compositions according to the present invention.

Halogenated hydrocarbon polymers, prepared according to the invention, may be used in conjunction with suitable soft resins and pigments, with or without linseed oil, volatile solvents, etc., in the compounding of paints, lacquers, varnishes, enamels, etc., which are resistant to chemical and mechanical influences and also non-inflammable, or they may be compounded with various resins alone, such as those prepared from petroleum hydrocarbons by various known methods, in order to improve the properties of such resins.

In coating compositions prepared according to the present invention, the amount of halogenated hydrocarbon polymer may be between the approximate limits of 1 to 70% by weight of the vehicle, and preferably between the limits of about 5 to 30% depending upon the other constituents present.

Chlorinated hydrocarbon polymer finishes may, for example, be prepared in the same manner as ordinary lacquers. The finish dries by the evaporation of the solvent to a lustrous, adhesive film of great protective power and pleasing appearance. Such finishes are of particular value where unusually great resistance to chemical action is desired. Panels of chlorinated isobutylene polymer enamels have, for example, been found to be in good condition after immersion for 10 weeks in 40% sulfuric acid, 40% lactic acid and 40% sodium hydroxide, and after immersion for 5 weeks in 10% hydrochloric acid. Also, the exposure of similar enamels to sulfuric acid and sulfur dioxide and trioxide fumes in refinery acid treating tanks showed them to be more resistant than the highest grades of oil base paint. Enamels of this kind have also been found to be especially resistant under severe weathering conditions.

For finishes which are not subject to severe abrasions a chlorinated isobutylene polymer of low chlorine content and high elasticity has been found to be particularly desirable, since this material requires less plasticizer and hence gives a film of increased life and greater chemical resistance. Such films are preferably pigmented to obtain proper drying. With the harder varieties of chlorinated products, such as chlorinated isobutylene polymer containing above 45% chlorine, it may be necessary to use as much as 30% of a plasticizer, depending upon the use to which the finish is to be put. For general outside use the addition of drying oils and of drying oil-modified alkyd resin mixtures is preferred. Tricresyl phosphate and dibutyl phthalate are especially suitable plasticizers, although many other commercially available plasticizers, such as dibutyl tartrate, raw, blown, or boiled linseed oil, boiled tung oil, methyl cyclohexyl adipate, etc. are also compatible with chlorinated isobutylene polymer. Film plasticity is preferably obtained by changing the type of chlorinated polymer used rather than by adding more plasticizer. For finishes to be applied to concrete, stucco, plaster, cement, asbestos boards, brick and similar surfaces it is preferable to use a plasticizer which will not saponify, such as chlorinated diphenyl, highly aromatic oils and terpene balsams.

In general, the preparation of a coating composition according to the present invention, where a pigment is not used, is accomplished by first measuring out the solvent mixture, then adding the halogenated polymer with vigorous agitation to the solvent mixture and finally adding the plasticizer and any additional resins to the solution. In order that the film may dry properly, it is desirable that the solvents be balanced, i. e., that sufficient high boiling solvent be used in the mixture to allow the film to remain open until substantially all the solvent is evaporated. In the preparation of coating compositions containing pigments, it is desirable to measure out the solvent mixture, add a portion of the solvent to the halogenated polymer with vigorous agitation to make a viscous solution, grind the pigment and the plasticizer, if any is to be used, in the polymer solution, and add the balance of the solvent mixture, preferably just before application. The pigment should be entirely wetted by the solution in order to obtain proper flow and leveling.

In the preparation of paints, the halogenated hydrocarbon polymers of the present invention are dissolved in suitable solvents, such as drying oils, and the desired pigments are added, along with such other ingredients, as drying accelerators, oxidation inhibitors for the paint film, etc., as preferred. The following is an illustration of a suitable formula for a paint composition:

| | Parts |
|---|---|
| Chlorinated isobutylene polymer (45% Cl) | 200 |
| Bodied tung oil | 60 |
| Hydrogenated methyl abietate | 60 |
| Iron oxide | 150 |

The pigment is ground in a paste formed from the other constituents. Sufficient thinner is added to bring the mixture to the correct brushing viscosity. A suitable thinner consists of 100 parts of a sulfur dioxide extract (boiling range about 275–350° F., kauri butanol value 78.7) of a petroleum distillate, 150 parts of a sulfur dioxide extract (boiling range about 350–410° F., kauri butanol value 73.7) of a petroleum distillate, and 100 parts of a straight run petroleum naphtha (boiling range about 167–237° F.).

In the preparation of lacquers according to the present invention, the halogenated polymer is dissolved in the volatile solvent, and other ingredients, such as plasticizers, preservatives, etc., are added as desired. A typical lacquer formula is the following:

| | Parts by weight |
|---|---|
| Chlorinated isobutylene polymer solution | 15 |
| Wet 1/2 sec. nitrocellulose | 10 |
| Dibutyl phthalate | 5 |
| Red pigment | 20 |

The polymer solution consists of 60 parts by weight of chlorinated isobutylene polymer (45% Cl) and 40 parts of a sulfur dioxide extract (boiling range about 200–275° F., kauri butanol value 72.5) of a petroleum distillate. The above mixture is thinned to a spraying viscosity with a mixture consisting of 50 parts of toluol, 25 parts of ethyl acetate, 5 parts of butanol and 50 parts of butyl acetate.

Varnishes may be similarly prepared from the halogenated polymers, and a typical formula is the following:

| | Parts |
|---|---|
| Chlorinated isobutylene polymer solution | 20 |
| Hydrogenated methyl abietate | 6 |

The polymer solution consists of 60 parts of chlorinated isobutylene polymer (45% Cl) and 40 parts of a sulfur dioxide extract (boiling range about 200–275° C., kauri butanol value 72.5) of a petroleum distillate. The above mixture is thinned with a mixture consisting of 40 parts of ethyl acetate and 60 parts of the sulfur dioxide extract.

Enamels may be similarly prepared, adding pigments as desired.

In all of the above examples of formulas for paints, lacquers and varnishes, the chlorinated polymer used contained about 45% of chlorine and was prepared by passing chlorine through a solution of isobutylene polymer of molecular weight of about 60,000 to 70,000 in carbon tetrachloride in the presence of sunlight. The isobutylene polymer was prepared by contacting isobutylene with a boron fluoride catalyst at about −78° C.

A water emulsion of a halogenated polymer, such as chlorinated isobutylene polymer, may be used to treat cloth or paper to render the latter resistant to flames and chemicals. Such an emulsion may be prepared by adding an emulsifying agent, such as oleic acid, to the resin dissolved in an aromatic solvent, and mixing this solution with a solution of triethanol amine in water.

A waterproof and chemical-proof fabric suitable for raincoats, shower curtains, etc., may be made by calendering cloth with chlorinated isobutylene polymer alone or mixed with montan, carnauba and spermaceti waxes and with chlorinated naphthalene.

Halogenated hydrocarbon polymer coatings may be applied in any well known manner, such as spraying, brushing, flowing, dipping or roller-coating. Such coatings are most useful on metal surfaces which should be free of mill scale, rust, grease or dirt. Sand blasting or roughening of the surface to be coated with a wire brush will facilitate adhesion. Since the finishes remain soluble after drying, they are preferably applied in only one coat, when applied by brushing, in order to avoid brushing over previously coated areas. Lacquers containing halogenated hydrocarbon polymers can be easily sprayed without webbing and other mechanical difficulties ordinarily encountered in the spray application of lacquers of this type. A plurality of thin coats requires less time and gives better films than a few thick coats. A short bake at a low temperature (below about 90° C.) is recommended for small articles, especially those coated with clear finishes.

The saturated high molecular weight polymers may also be mixed with wax, resins, mineral and vegetable oils, chloraromatics, esters, and the like, prior to or after halogenation. When blended in mineral oils, the chlorinated polymer may be used in conjunction with oxidation inhibiting amines.

The halogenated hydrocarbon polymers of the present invention are useful as fire-resistant impregnating agents, for impregnating various types of porous or fibrous materials, such as wood, oil, paper, etc., especially when incorporated in small quantities with a wax, such as a paraffinic wax.

The polymers may frequently serve to advantage as solvents or plasticizers. For delustering artificial silk, these compounds may be mixed with an inert organic material of an oily or waxy nature, such as petroleum oil, petroleum jelly and paraffin wax, and the mixture added to solutions of artificial silk to be spun.

It is not intended that the invention be limited to the particular examples, modifications and embodiments which have been given merely for the sake of illustration, but only by the appended claims in which it is intended to claim all novelty inherent in the invention as broadly as the prior art permits.

What we claim is:

1. A paint composition comprising a chlorinated isobutylene polymer, a drying oil and a pigment.

2. A paint composition comprising 200 parts by weight of a chlorinated isobutylene polymer containing approximately 45% of chlorine, prepared by the chlorination of an isobutylene polymer of molecular weight of about 60,000 to 70,000, 60 parts by weight of bodied tung oil, 60 parts by weight of hydrogenated methyl abietate and 150 parts by weight of iron oxide.

3. A coating composition comprising a substantially saturated linear hydrocarbon polymer of the aliphatic series having a molecular weight in excess of about 1,000, having a plurality of short alkyl side chains and having chemically combined therewith at least 1% of a halogen, said polymer being dissolved in a drying oil.

4. A coating composition comprising a polymer of an isoolefin having the formula

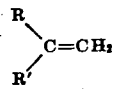

where R and R' represent alkyl radicals having one to four carbon atoms, said polymer having chemically combined therewith at least 1% by weight of a halogen and being dissolved in a drying oil.

5. A coating composition comprising a chlorinated isobutylene polymer dissolved in a drying oil.

6. A coating composition comprising a substantially saturated linear hydrocarbon polymer of the aliphatic series having a molecular weight in excess of about 1,000, having a plurality of short alkyl side chains and having chemically combined therewith at least 1% of chlorine, said polymer being dissolved in a drying oil.

7. A coating composition comprising a chlorinated isobutylene polymer containing at least 10%, by weight, of chlorine and obtained by the chlorination of an isobutylene polymer of a molecular weight from 5,000 to 200,000, said chlorinated polymer being dissolved in a drying oil.

ARNOLD J. MORWAY.
FLOYD L. MILLER.